United States Patent
Pope et al.

(10) Patent No.: US 10,671,458 B2
(45) Date of Patent: Jun. 2, 2020

(54) EPOLL OPTIMISATIONS

(71) Applicant: XILINX, INC., San Jose, CA (US)

(72) Inventors: Steven L. Pope, Costa Mesa, CA (US); David J. Riddoch, Fenstanton (GB)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 15/042,507

(22) Filed: Feb. 12, 2016

(65) Prior Publication Data

US 2016/0162330 A1 Jun. 9, 2016

Related U.S. Application Data

(62) Division of application No. 13/158,176, filed on Jun. 10, 2011, now Pat. No. 9,384,071.

(Continued)

(51) Int. Cl.
*G06F 9/54* (2006.01)
*G06F 9/48* (2006.01)

(52) U.S. Cl.
CPC ............ *G06F 9/545* (2013.01); *G06F 9/48* (2013.01)

(58) Field of Classification Search
CPC .................... G06F 9/48; G06F 9/545
See application file for complete search history.

(56) References Cited

U.S. PATENT DOCUMENTS 5,272,599 A 12/1993 Koenen
5,325,532 A 6/1994 Crosswy et al.
(Continued)

FOREIGN PATENT DOCUMENTS

EP 620521 A2 10/1994
WO 2001048972 A1 7/2001
(Continued)

OTHER PUBLICATIONS

Moore, Gordon E., Electronics, vol. 38, No. 8, pp. 114-117, 1965, Apr. 19, 1965.
(Continued)

*Primary Examiner* — Doon Y Chow
*Assistant Examiner* — Carina Yun
(74) *Attorney, Agent, or Firm* — Haynes Beffel & Wolfeld, LLP; Ernest J. Beffel, Jr.; Paul A. Durdik

(57) ABSTRACT

A method for managing I/O event notifications in a data processing system comprising a plurality of applications and an operating system having a kernel and an I/O event notification mechanism operable to maintain a plurality of I/O event notification objects each handling a set of file descriptors associated with one or more I/O resources. For each of a plurality of application-level configuration calls: intercepting at a user-level interface a configuration call from an application to the I/O event notification mechanism for configuring an I/O event notification object; and storing a set of parameters of the configuration call at a data structure, each set of parameters representing an operation on the set of file descriptors handled by the I/O event notification object; and subsequently, upon meeting a predetermined criterion: the user-level interface causing the plurality of configuration calls to be effected by means of a first system call to the kernel.

11 Claims, 2 Drawing Sheets

Related U.S. Application Data

(60) Provisional application No. 61/470,396, filed on Mar. 31, 2011.

(56) References Cited

U.S. PATENT DOCUMENTS

| | | | |
|---|---|---|---|
| 5,946,189 | A | 8/1999 | Koenen et al. |
| 6,098,112 | A | 8/2000 | Ishijima et al. |
| 6,160,554 | A | 12/2000 | Krause |
| 6,304,945 | B1 | 10/2001 | Koenen |
| 6,349,035 | B1 | 2/2002 | Koenen |
| 6,438,130 | B1 | 8/2002 | Kagan et al. |
| 6,502,203 | B2 | 12/2002 | Barron et al. |
| 6,530,007 | B2 | 3/2003 | Olarig et al. |
| 6,667,918 | B2 | 12/2003 | Leader et al. |
| 6,718,392 | B1 | 4/2004 | Krause |
| 6,728,743 | B2 | 4/2004 | Shachar |
| 6,732,211 | B1 * | 5/2004 | Goyal .................. G06F 9/468 707/999.2 |
| 6,735,642 | B2 | 5/2004 | Kagan et al. |
| 6,768,996 | B1 | 7/2004 | Steffens et al. |
| 6,904,534 | B2 | 6/2005 | Koenen |
| 6,950,961 | B2 | 9/2005 | Krause et al. |
| 6,978,331 | B1 | 12/2005 | Kagan et al. |
| 7,093,158 | B2 | 8/2006 | Barron et al. |
| 7,099,275 | B2 | 8/2006 | Sarkinen et al. |
| 7,103,626 | B1 | 9/2006 | Recio et al. |
| 7,103,744 | B2 | 9/2006 | Garcia et al. |
| 7,136,397 | B2 | 11/2006 | Sharma |
| 7,143,412 | B2 | 11/2006 | Koenen |
| 7,149,227 | B2 | 12/2006 | Stoler et al. |
| 7,151,744 | B2 | 12/2006 | Sarkinen et al. |
| 7,216,225 | B2 | 5/2007 | Haviv et al. |
| 7,240,350 | B1 | 7/2007 | Eberhard et al. |
| 7,245,627 | B2 | 7/2007 | Goldenberg et al. |
| 7,254,237 | B1 | 8/2007 | Jacobson et al. |
| 7,285,996 | B2 | 10/2007 | Fiedler |
| 7,316,017 | B1 | 1/2008 | Jacobson et al. |
| 7,346,702 | B2 | 3/2008 | Haviv |
| 7,386,619 | B1 | 6/2008 | Jacobson et al. |
| 7,403,535 | B2 | 7/2008 | Modi et al. |
| 7,404,190 | B2 | 7/2008 | Krause et al. |
| 7,502,826 | B2 | 3/2009 | Barron et al. |
| 7,509,355 | B2 | 3/2009 | Hanes et al. |
| 7,518,164 | B2 | 4/2009 | Smelloy et al. |
| 7,551,614 | B2 | 6/2009 | Teisberg et al. |
| 7,554,993 | B2 | 6/2009 | Modi et al. |
| 7,573,967 | B2 | 8/2009 | Fiedler |
| 7,580,415 | B2 | 8/2009 | Hudson et al. |
| 7,580,495 | B2 | 8/2009 | Fiedler |
| 7,594,234 | B1 * | 9/2009 | Dice .................. G06F 9/461 718/100 |
| 7,617,376 | B2 | 11/2009 | Chadalapaka et al. |
| 7,631,106 | B2 | 12/2009 | Goldenberg et al. |
| 7,650,386 | B2 | 1/2010 | McMahan et al. |
| 7,653,754 | B2 | 1/2010 | Kagan et al. |
| 7,688,853 | B2 | 3/2010 | Santiago et al. |
| 7,757,232 | B2 | 7/2010 | Hilland et al. |
| 7,801,027 | B2 | 9/2010 | Kagan et al. |
| 7,802,071 | B2 | 9/2010 | Oved |
| 7,813,460 | B2 | 10/2010 | Fiedler |
| 7,827,442 | B2 | 11/2010 | Sharma et al. |
| 7,835,375 | B2 | 11/2010 | Sarkinen et al. |
| 7,848,322 | B2 | 12/2010 | Oved |
| 7,856,488 | B2 | 12/2010 | Cripe et al. |
| 7,864,787 | B2 | 1/2011 | Oved |
| 7,904,576 | B2 | 3/2011 | Krause et al. |
| 7,921,178 | B2 | 4/2011 | Haviv |
| 7,929,539 | B2 | 4/2011 | Kagan et al. |
| 7,930,437 | B2 | 4/2011 | Kagan et al. |
| 7,934,959 | B2 | 5/2011 | Rephaeli et al. |
| 7,978,606 | B2 | 7/2011 | Buskirk et al. |
| 8,000,336 | B2 | 8/2011 | Harel |
| 8,839,253 | B2 * | 9/2014 | Gellerich .................. G06F 9/526 712/216 |
| 2002/0059052 | A1 | 5/2002 | Bloch et al. |
| 2002/0112139 | A1 | 8/2002 | Krause et al. |
| 2002/0129293 | A1 | 9/2002 | Hutton et al. |
| 2002/0140985 | A1 | 10/2002 | Hudson |
| 2002/0156784 | A1 | 10/2002 | Hanes et al. |
| 2003/0007165 | A1 | 1/2003 | Hudson |
| 2003/0058459 | A1 | 3/2003 | Wu et al. |
| 2003/0063299 | A1 | 4/2003 | Cowan et al. |
| 2003/0065856 | A1 | 4/2003 | Kagan et al. |
| 2003/0081060 | A1 | 5/2003 | Zeng et al. |
| 2003/0172330 | A1 | 9/2003 | Barron et al. |
| 2003/0191786 | A1 | 10/2003 | Matson et al. |
| 2003/0202043 | A1 | 10/2003 | Zeng et al. |
| 2003/0214677 | A1 | 11/2003 | Bhaskar et al. |
| 2004/0071250 | A1 | 4/2004 | Bunton et al. |
| 2004/0078543 | A1 † | 4/2004 | Koning et al. |
| 2004/0128667 | A1 † | 7/2004 | Caceres et al. |
| 2004/0141642 | A1 | 7/2004 | Zeng et al. |
| 2004/0177342 | A1 | 9/2004 | Worley |
| 2004/0190533 | A1 | 9/2004 | Modi et al. |
| 2004/0190538 | A1 | 9/2004 | Bunton et al. |
| 2004/0190557 | A1 | 9/2004 | Barron |
| 2004/0193734 | A1 | 9/2004 | Barron et al. |
| 2004/0193825 | A1 | 9/2004 | Garcia et al. |
| 2004/0210754 | A1 | 10/2004 | Barron et al. |
| 2004/0252685 | A1 | 12/2004 | Kagan et al. |
| 2005/0008223 | A1 | 1/2005 | Zeng et al. |
| 2005/0018221 | A1 | 1/2005 | Zeng et al. |
| 2005/0038918 | A1 | 2/2005 | Hilland et al. |
| 2005/0038941 | A1 | 2/2005 | Chadalapaka et al. |
| 2005/0039171 | A1 | 2/2005 | Avakian et al. |
| 2005/0039172 | A1 | 2/2005 | Rees et al. |
| 2005/0039187 | A1 | 2/2005 | Avakian et al. |
| 2005/0066333 | A1 | 3/2005 | Krause et al. |
| 2005/0071824 | A1 * | 3/2005 | K. N. .................. G06F 9/45504 717/138 |
| 2005/0081204 | A1 * | 4/2005 | Schopp .................. G06F 9/526 718/100 |
| 2005/0172181 | A1 | 8/2005 | Huliehel |
| 2005/0219278 | A1 | 10/2005 | Hudson |
| 2005/0219314 | A1 | 10/2005 | Donovan et al. |
| 2005/0231751 | A1 | 10/2005 | Wu et al. |
| 2006/0026443 | A1 | 2/2006 | McMahan et al. |
| 2006/0045098 | A1 | 3/2006 | Krause |
| 2006/0126619 | A1 | 6/2006 | Teisberg et al. |
| 2006/0165074 | A1 | 7/2006 | Modi et al. |
| 2006/0193318 | A1 | 8/2006 | Narasimhan et al. |
| 2006/0228637 | A1 | 10/2006 | Jackson et al. |
| 2006/0248191 | A1 | 11/2006 | Hudson et al. |
| 2007/0005827 | A1 * | 1/2007 | Sarangam ............... H04L 67/14 710/46 |
| 2007/0188351 | A1 | 8/2007 | Brown et al. |
| 2007/0199045 | A1 | 8/2007 | Kime et al. |
| 2007/0220183 | A1 | 9/2007 | Kagan et al. |
| 2008/0024586 | A1 | 1/2008 | Barron |
| 2008/0082532 | A1 * | 4/2008 | McKenney ......... G06F 9/30087 |
| 2008/0109526 | A1 | 5/2008 | Subramanian et al. |
| 2008/0115216 | A1 | 5/2008 | Barron et al. |
| 2008/0115217 | A1 | 5/2008 | Barron et al. |
| 2008/0126509 | A1 | 5/2008 | Subramanian et al. |
| 2008/0135774 | A1 | 6/2008 | Hugers |
| 2008/0147828 | A1 | 6/2008 | Enstone et al. |
| 2008/0148400 | A1 | 6/2008 | Barron et al. |
| 2008/0177890 | A1 | 7/2008 | Krause et al. |
| 2008/0244060 | A1 | 10/2008 | Cripe et al. |
| 2008/0250400 | A1 * | 10/2008 | Vertes .................. G06F 9/4426 717/158 |
| 2008/0301406 | A1 | 12/2008 | Jacobson et al. |
| 2008/0304519 | A1 | 12/2008 | Koenen et al. |
| 2008/0313652 | A1 † | 12/2008 | Klein et al. |
| 2009/0165003 | A1 | 6/2009 | Jacobson et al. |
| 2009/0201926 | A1 | 8/2009 | Kagan et al. |
| 2009/0213856 | A1 | 8/2009 | Paatela et al. |
| 2009/0268612 | A1 | 10/2009 | Felderman et al. |
| 2009/0302923 | A1 | 12/2009 | Smeloy et al. |
| 2010/0088437 | A1 | 4/2010 | Zahavi |
| 2010/0100700 | A1 * | 4/2010 | Krauss .................. G06F 9/5022 711/206 |
| 2010/0138840 | A1 | 6/2010 | Kagan et al. |

(56) References Cited

U.S. PATENT DOCUMENTS

| | | | |
|---|---|---|---|
| 2010/0138843 A1* | 6/2010 | Freericks | G06F 9/542 719/318 |
| 2010/0169880 A1 | 7/2010 | Haviv et al. | |
| 2010/0188140 A1 | 7/2010 | Smeloy | |
| 2010/0189206 A1 | 7/2010 | Kagan | |
| 2010/0265849 A1 | 10/2010 | Harel | |
| 2010/0274876 A1 | 10/2010 | Kagan et al. | |
| 2011/0004457 A1 | 1/2011 | Haviv et al. | |
| 2011/0010557 A1 | 1/2011 | Kagan et al. | |
| 2011/0029669 A1 | 2/2011 | Chuang et al. | |
| 2011/0029847 A1 | 2/2011 | Goldenberg et al. | |
| 2011/0044344 A1 | 2/2011 | Hudson et al. | |
| 2011/0058571 A1 | 3/2011 | Bloch et al. | |
| 2011/0083064 A1 | 4/2011 | Kagan et al. | |
| 2011/0096668 A1 | 4/2011 | Bloch et al. | |
| 2011/0113083 A1 | 5/2011 | Shahar | |
| 2011/0116512 A1 | 5/2011 | Crupnicoff et al. | |
| 2011/0119673 A1 | 5/2011 | Bloch et al. | |
| 2011/0173352 A1 | 7/2011 | Sela et al. | |
| 2012/0167119 A1* | 6/2012 | Liss | G06F 9/544 719/318 |

FOREIGN PATENT DOCUMENTS

| | | | |
|---|---|---|---|
| WO | 2002035838 | A1 | 5/2002 |
| WO | 2008127672 | A2 | 10/2008 |
| WO | 2009136933 | A1 | 11/2009 |
| WO | 20090134219 | A1 | 11/2009 |
| WO | 2010020907 | A2 | 2/2010 |
| WO | 2010087826 | A1 | 8/2010 |
| WO | 2011043769 | A1 | 4/2011 |
| WO | 2011053305 | A1 | 5/2011 |
| WO | 2011053330 | A1 | 5/2011 |

OTHER PUBLICATIONS

Dennis, Jack B. and Van Horn, Earl C., Communications of the ACM, vol. 9, No. 3, pp. 143-155, 1966, Mar. 1966.

Zelkowitz, Marvin, Communications of the ACM, vol. 14, No. 6, p. 417-418, 1971, Jun. 1971.

Hill, J. Carver, Communications of the ACM, vol. 16, No. 6, p. 350-351, 1973, Jun. 1973.

Kuo, F.F., "The ALOHA system," ACM Computer Communication Review, vol. 4 No. 1, 1974, Jan. 1974, pp. 5-8.

Cerf, Vinton and Kahn, Robert, IEEE Transactions on Communications, vol. COM-22, No. 5, pp. 637-648, 1974, May 1974.

Cerf, V., et al.; ACM Computer Communication Review, vol. 6 No. 1, p. 1-18, 1976, Jan. 1976.

Metcalfe, Robert M. and Boggs, David R., Communications of the ACM, vol. 19, Issue 7, pp. 395-404, 1976, Jul. 1976.

Kermani, P. and Kleinrock, L. Computer Networks, vol. 3, No. 4, pp. 267-286, 1979, Sep. 1979.

McQuillan, John M., et al.; Proceedings of the 6th Data Communications Symposium, p. 63, 1979, Nov. 1979.

Birrell, Andrew D., et al.; Communications of the ACM, vol. 25, Issue 4, pp. 260-274, 1982, Apr. 1982.

Leslie, Ian M., et al.; ACM Computer Communication Review, vol. 14, No. 2, pp. 2-9, 1984, Jun. 1984.

Nagle, John, ACM Computer Communication Review, vol. 14, No. 4, p. 11-17, 1984, Oct. 1984.

Brandriff, Robert K., et al.; "Development of a TCP/IP for the IBM/370," ACM SIGCOMM Computer Communication Review, vol. 15, No. 4, 1985, Sep. 1985, pp. 2-8.

Kline, C., "Supercomputers on the internet: a case study," ACM Computer Communication Review, vol. 17, No. 5, 1987, Aug. 1987, pp. 27-33.

Kent, Christopher A. and Mogul, Jeffrey C., ACM Computer Communication Review, vol. 17, No. 5, pp. 390-401, 1987, Oct. 1987.

Delp, Gary S., et al.; ACM Computer Communication Review, vol. 18, No. 4, p. 165-174, 1988, Aug. 1988.

Boggs, David R., et al.; ACM Computer Communication Review, vol. 18, No. 4, p. 222-234, 1988, Aug. 1988.

Kanakia, H. and Cheriton, D., ACM Computer Communication Review, vol. 18, No. 4, p. 175-187, 1988, Aug. 1988.

Jacobson, V., ACM Computer Communication Review, vol. 18, No. 4, p. 314-329, 1988, Aug. 1988.

Clark, David D., ACM Computer Communication Review, vol. 18, No. 4, pp. 106-114, 1988, Aug. 1988.

Mockapetris, Paul V. and Dunlap, Kevin J., ACM Computer Communication Review, vol. 18, No. 4, pp. 123-133, 1988, Aug. 1988.

Simmons, Margaret L. and Wasserman, Harvey J., Proceedings of the 1988 ACM/IEEE conference on Supercomputing, p. 288-295, Orlando, Florida, Nov. 12, 1988.

Borman, David A., ACM Computer Communication Review, vol. 19, No. 2, p. 11-15, 1989, Apr. 1989.

Braden, R., et al.; ACM Computer Communication Review, vol. 19, No. 2, p. 86-94, 1989, Apr. 1989.

Clark, David D., et al.; IEEE Communications Magazine, vol. 27, No. 6, pp. 23-29, 1989, Jun. 1989.

Cheriton, David R., ACM Computer Communication Review, vol. 19, No. 4, p. 158-169, 1989, Sep. 1989.

McAuley, Derek Robert, "Protocol Design for High Speed Networks," Ph.D. Thesis, University of Cambridge, 1989, Sep. 1989, 104 pp.

Partridge, Craig, ACM Computer Communication Review, vol. 20, No. 1, p. 44-53, 1990, Jan. 1990.

Clark, D. D. and Tennenhouse, D. L., ACM Computer Communication Review, vol. 20, No. 4, pp. 200-208, 1990, Sep. 1990.

Cooper, Eric C., et al.; ACM Computer Communication Review, vol. 20, No. 4, p. 135-144, 1990, Sep. 1990.

Davie, Bruce S., "A host-network interface architecture for ATM," ACM Computer Communication Review, vol. 21, No. 4, 1991, Sep. 1991, pp. 307-315.

Traw, C. Brendan S., et al.; ACM Computer Communication Review, vol. 21, No. 4, p. 317-325, 1991, Sep. 1991.

Leslie, Ian and McAuley, Derek R., ACM Computer Communication Review, vol. 21, No. 4, p. 327, 1991, Sep. 1991.

Hayter, Mark and McAuley, Derek, ACM Operating Systems Review, vol. 25, Issue 4, p. 14-21, 1991, Oct. 1991.

Finn, Gregory G., ACM Computer Communication Review, vol. 21, No. 5, p. 18-29, 1991, Oct. 1991.

Greg Chesson, "The Evolution of XTP," Proceedings of the Third International Conference on High Speed Networking, 1991, Nov. 1991, 10 pp.

Dixon, Michael J., "System support for multi-service traffic," University of Cambridge Computer Laboratory Technical Report No. 245, Jan. 1992, 113 pp.

Cohen, Danny; Finn, Gregory; Felderman, Robert; DeSchon, Annette; Made available by authors, Jan. 10, 1992, "ATOMIC: A Local Communication Network Created through Repeated Application of Multicomputing Components," 11 pp + cover.

Gene Tsudik; ACM Computer Communication Review, vol. 22, No. 5, pp. 29-38, 1992, Oct. 1992.

Steenkiste, Peter, "Analyzing communication latency using the Nectar communication processor," ACM Computer Communication Review, vol. 22, No. 4, 1992, Oct. 1992, pp. 199-209.

McKenney, Paul E. and Dove, Ken F., "Efficient demultiplexing of incoming TCP packets," ACM Computer Communication Review, vol. 22, No. 4, 1992, Oct. 1992, pp. 269-279.

Ruetsche, Erich and Kaiserswerth, Matthias, "TCP/IP on the parallel protocol engine," Proceedings of the IFIP TC6/WG6, 4 Fourth International Conference on High Performance Networking IV, Dec. 14, 1992, pp. 119-134.

Traw, C. and Smith, J., IEEE Journal on Selected Areas in Communications, pp. 240-253, 1993, Feb. 1993.

Ruetsche, E., "The architecture of a Gb/s multimedia protocol adapter," ACM Computer Communication Review, vol. 23, No. 3, 1993, Jul. 1993, pp. 59-68.

Smith, Jonathan M. and Traw, C. Brendan S., IEEE Network, vol. 7, Issue 4, pp. 44-52, 1993, Jul. 1993.

(56) References Cited

OTHER PUBLICATIONS

Michel, Jeffrey R., "The Design and Evaluation of an Off-Host Communications Protocol Architecture," M.Sci. Thesis, University of Virginia, 1993, Aug. 1993, 139 pp.
Hayter, Mark David , "A Workstation Architecture to Support Multimedia," Ph.D. Thesis, University of Cambridge, 1993, Sep. 1993, 111 pp.
Kay, Jonathan and Pasquale, Joseph, ACM Computer Communication Review, vol. 23, No. 4, pp. 259-268, 1993, Oct. 1993.
Leland, W. E., et al.; ACM Computer Communication Review, vol. 23, No. 4, p. 85-95, 1993, Oct. 1993.
Regnier G., "Protocol Onload vs. Offload," 14th Symposium on High Performance Interconnects, Aug. 23, 2006, 1pp.
Montry G., OpenFabrics Alliance presentation slides, 14th Symposium on High Performance Interconnects, Aug. 23, 2006, 8pp.
Dec. 10, 2012 Extended Search Report in related application EP 12 16 1064, 8 pp.
Ouyang X et al., "Fast Checkpointing by Write Aggregation with Dynamic Buffer and Interleaving on Multicore Architecture," Intl. Conf. on High Performance Computing, Kochi, India, 2009, IEEE pp. 99-108.
Ouyang X et al., "Accelerating Checkpoint Operation by Node-Level Write Aggregation on Multicore Systems," Intl. Conf. on Parallel Processing, Vienna, Austria, 2009, pp. 34-41.
Linux programmer's manual, EPOLL(7) Feb. 2009, "Epoll—I/O event notification facility," XP055046179, 4 pp.
U.S. Appl. No. 13/158,176—Office Action dated Jun. 30, 2014, 22 pages.
U.S. Appl. No. 13/158,176—Final Office Action dated Nov. 10, 2014, 22 pages.
Goldt et al., "The Linux Programmer's Guide," Linux, v 0.4, Mar. 1995, 131 pages.
Hrozek and Schneide, "What is Preloading?", available at https://blog.cryptomilk.org/2014/07/21/what-is-preloading/, 1 page, accessed Apr. 10, 2015.
Hallinan, Embedded Linux Primer: A Practical Real-World Approach, Chapter 14: Kernel Debugging Techniques, available at <http://www.linuxjournal.com/article/9252> (2006), 5 pages, accessed Apr. 10, 2015.
*Oracle Corporation and Oracle U.S.A., Inc. v. Parallel Newtorks, LLP*, Civ No. 06-414-SLR, Memorandum Order dated Dec. 4, 2008, 4 pages.
*Superspeed Software, Inc. versus Oracle Corp.*, Civil Action No. H-04-3409, Order dated Dec. 16, 2005, 32 pages.
"Intercept" definition, The American Heritage Dictionary of the English Language, Houghton Mifflin Company, Boston, MA and New York, NY, 1992, 3 pages.
U.S. Appl. No. 13/158,176—Office Action dated Jun. 24, 2015, 27 pages.
U.S. Appl. No. 13/158,176—Notice of Allowance dated Mar. 2, 2016, 7 pages.
Hrvoye, Bilic, et al.; article in Proceedings of the 9th Symposium on High Performance Interconnects, "Deferred Segmentation for Wire-Speed Transmission of Large TCP Frames over Standard GbE Networks," Aug. 22, 2001, 5pp.
Hrvoye, Bilic, et al.; presentation slides from 9th Symposium on High Performance Interconnects, "Deferred Segmentation for Wire-Speed Transmission of Large TCP Frames over Standard GbE Networks," Aug. 22, 2001, 9pp.
Lowekamp, Bruce, et al., "Topology discovery for large ethernet networks," ACM SIGCOMM Computer Communication Review—Proc. 2001 SIGCOMM conf., vol. 31, No. 4, 2001, Oct. 2001, pp. 237-248.
Shivam, Piyush, et al., "EMP: Zero-copy OS-bypass NIC-driven Gigabit Ethernet Message Passing," Proc. 2001 ACM/IEEE Conf. on Supercomputing, Denver, Nov, 10, 2001 (8 pp).
Ross, Robert, et al., "A Case Study in Application I/O on Linux Clusters," Proc. 2001 ACM/IEEE Conf. on Supercomputing, Denver, Nov. 2001, 17pp.

Blanton, E. and Allman, M., "On Making TCP More Robust to Packet Reordering," ACM Computer Communication Review, vol. 32, No. 1, 2002, Jan. 2002, pp. 20-30.
Rangarajan, Murali, et al., "TCP Servers: Offloading TCP Processing in Internet Servers. Design, Implementation, and Performance," Technical Report DCR-TR-481, Computer Science Department, Rutgers University, 2002, Mar. 2002, 14 pp.
Crowcroft, Jon and McAuley, Derek, "ATM: A Retrospective on Systems Legacy or 'A technology with a fabulous future behind it?'", ACM Computer Communication Review, vol. 32, No. 5, 2002, Nov. 2002, pp. 11-12.
Kalmanek, Charles, ACM Computer Communication Review, vol. 32, No. 5, pp. 13-19, 2002, Nov. 2002.
Smith, Jonathan, ACM Computer Communication Review, vol. 32, No. 5, pp. 29-37, 2002, Nov. 2002.
Adiga, NR, et al., "An Overview of the BlueGene/L Supercomputer," Proceedings of the 2002 ACM/IEEE conference on Supercomputing, Baltimore, Nov. 27, 2002, pp. 1-22.
Sistare, Steven J. and Jackson, Christopher J., Proceedings of the 2002 ACM/IEEE conference on Supercomputing, p. 1-15, Baltimore, Nov. 16, 2002.
Bush, R. Bush and Meyer, D., IETF Network Working Group, Request for Comments memo: 3439 [extending RFC1958], Dec. 2002, Some Internet Architectural Guidelines and Philosophy, 25 pp, The Internet Society (c)2002.
Sarolahti, Pasi, et al., "F-RTO: an enhanced recovery algorithm for TCP retransmission timeouts," ACM Computer Communication Review, vol. 33, No. 2, 2003, Apr. 2003, pp. 51-63.
Kelly, Tom, ACM Computer Communication Review, vol. 33, No. 2, pp. 83-91, 2003, Apr. 2003.
Mogul, Jeffrey C., Proceedings of HotOS IX: The 9th Workshop on Hot Topics in Operating Systems, pp. 25-30, May 18, 2003.
McAuley, Derek and Neugebauer, Rolf, "A case for virtual channel processors," NICELI '03 Proc.of the ACM SIGCOMM workshop, Aug. 2003, pp. 237-242.
Hurwitz, Justin and Feng, Wu-chun, "Initial end-to-end performance evaluation of 10-Gigabit Ethernet," Proc. 11th Symposium on High Performance Interconnects, Aug. 20, 2003, pp. 116-121.
Aggarwal, Vinay, et al., summary, NICELI workshop, ACM SIGCOMM Computer Communication Review, vol. 33, No. 5, 2003, Oct. 2003, pp. 75-80.
Feng, Wu-chun, et al., "Optimizing 10-Gigabit Ethernet for Networks of Workstations, Clusters, and Grids: A Case Study," Proceedings of the 2003 ACM/IEEE conference on Supercomputing, Phoenix, Arizona, Nov. 15, 2003, 13 pp.
Liu, Jiuxing, et al., "Performance Comparison of MPI Implementations over InfiniBand, Myrinet and Quadrics," Proc. 2003 ACM/IEEE conference on Supercomputing, Phoenix, Arizona, Nov. 15, 2003, 14 pp (58-71).
Makineni, Srihari and Iyer, Ravi, Proceedings of the 10th International Symposium on High Performance Computer Architecture, pp. 152, Feb. 14, 2004.
Jin, Cheng, et al.; Proceedings of IEEE Infocom 2004, pp. 1246-1259, Mar. 7, 2004.
Currid, Andy, "TCP Offload to the Rescue," ACM Queue, vol. 2, No. 3, 2004, May 1, 2004, pp. 58-65.
Reginer, Greg, et al.; Computer, IEEE Computer Society, vol. 37, No. 11, pp. 48-58, 2004, Nov. 2004.
Declaration of Dr. Gregory L. Chesson in Support of Microsoft's Opposition to Alacritech's Motion for Preliminary Injunction; United States District Court, Northern District California, San Francisco Division, Case No. 3:04-cv-03284-JSW, filed Feb. 4, 2005, 289 pp including exhibits (declaration is 25 pp).
Lazowska, Edward D. and Patterson, David A., "Computing Research: A Looming Crisis," ACM Computer Communication Review, vol. 35, No. 2, 2005, Jul. 2005, pp. 65-68.
Feng, W., et al., "Permormance characterization of a 10-Gigabit Ethernet TOE," Proc. 13th Symp. on High Performance Interconnects, Aug. 17, 2005, pp. 58-63.
Leslie, B., et al., "User-level Device Drivers: Achieved Performance," J. Comput. Sci. & Technol., vol. 20, Sep. 2005, Sep. 2005, 17pp.

(56) References Cited

OTHER PUBLICATIONS

Balaji, P., et al., "Head-to TOE Evaluation of High-Performance Sockets over Protocol Offload Entines," Proceedings of the IEEE International Conference on Cluster Computing, 2005, Sep. 2005, 10pp.
Kamal, Humaira, et al., "SCTP versus TCP for MPI," Proc.2005 ACM/IEEE conference on Supercomputing, Seattle, Washington, Nov. 12, 2005, 14pp.
Bhandarkar, Sumitha, et al., "LTCP: Improving the Permormance of TCP in Highspeed Networks," ACM Computer Communication Review, vol. 36, No. 1, 2006, Jan. 2006, pp. 41-50.
Chu, H. K. Jerry, "Zero-Copy TCP in Solaris," Proc. USENIX Annual Technical Conference 1996, Jan. 1996, 13pp.
Calvert, Ken, ACM Computer Communication Review, vol. 36, No. 2, pp. 27-30, 2006, Apr. 2006.
Crowcroft, Jon Crowcroft; ACM Computer Communication Review, vol. 36, No. 2, pp. 51-52, 2006, Apr. 2006.
Minshall, Greg, et al.; ACM Computer Communication Review, vol. 36, No. 3, pp. 79-92, 2006, Jul. 2006.
Wetherall, Davi,; ACM Computer Communication Review, vol. 36, No. 3, pp. 77-78, 2006, Jul. 2006.
Geoffray, Patrick, "A Critique of RDMA," HPCWire article, Aug. 18, 2006, 7pp. Available at http://www.hpcwire.com/hpcwire/2006-08-18/a_critique_of_rdma-1.html.
Geoffray, P., "Protocol off-loading vs on-loading in high-performance networks," 14th Symposium on High Performance Interconnects, Aug. 23, 2006, 5pp.
Sancho, Jose Carlos, et al., "Quantifying the Potential Benefit of Overlapping Communication and Computation in Large-Scale Scientific Applications," Proc.2006 ACM/IEEE conference on Supercomputing, Tampa, Florida, Nov. 11, 2006, 16pp.
Sur, Sayantan, et al.; Proceedings of the 2006 ACM/IEEE conference on Supercomputing, Tampa, Florida, Nov. 11, 2006.
Pope, Steven and Riddoch, David, ACM Computer Communication Review, vol. 37, No. 2, pp. 89-92, 2007, Mar. 19, 2007.
Mansley, Kieran, et al.; Euro-Par Conference 2007, pp. 224-233, Rennes, France, Aug. 28, 2007.
Kaiserswerth, M., IEEE/ACM Transactions in Networking vol. 1, Issue 6, pp. 650-663, 1993, Dec. 1993.
Cohen, Danny, et al.; ACM Computer Communication Review, vol. 23, No. 4, p. 32-44, 1993, Jul. 1993.
Evans, J. and Buller, T., IEEE TCGN Gigabit Networking Workshop, 2001, Apr. 22, 2001.
Wilkes, M.V. and Needham, R.M., "The Cambridge Model Distributed System," ACM SIGOPS Operating Systems Review, vol. 14, Issue 1, pp. 21-29, 1980, Jan. 1980.
Dickman, L., "Protocol OffLoading vs OnLoading in High Performance Networks," 14th Symposium on High Performance Interconnects, Aug. 23, 2006, 8pp.
Mogl,., "TCP offload is a dumb idea whose time has come," USENIX Assoc., Proceedings of HotOS IX: The 9th Workshop on Hot Topics in Operating Systems, May 2003, pp. 24-30.
Petrini, F., "Protocol Off-loading vs On-loading in High-Performance Networks," 14th Symposium on High Performance Interconnects, Aug. 23, 2006, 4pp.
Thekkath, C. A, et al., "Implementing network protocols at user level," ACM Computer Communication Review, vol. 23, No. 4, 1993, Oct. 1993, pp. 64-73.
Singh, Raj K., et al.; Proceedings of the 1993 ACM/IEEE conference on Supercomputing, p. 452-461, Portland, Oregon, Nov. 15, 1993.
Druschel, Peter and Peterson, Larry L., ACM Operating Systems Review, vol. 27, Issue 5, p. 189-202, 1993, Dec. 1993.
Kaiserswerth, Matthias, IEEE/ACM Transactions on Networking, vol. 1, No. 6, p. 650-663, 1993, Dec. 1993.
Maeda, Chris and Bershad, Brian, ACM Operating Systems Review, vol. 27, Issue 5, p. 244-255, 1993, Dec. 1993.
Regnier, Greg, et al.; IEEE Micro, vol. 24, No. 1, p. 24-31, 1994, Jan. 1994.
Vis, J., ACM Computer Communication Review, vol. 24, No. 1, pp. 7-11, 1994, Jan. 1994.
Cohen, Danny; Finn, Gregory; Felderman, Robert; and DeSchon, Annette, "ATOMIC: A High Speed Local Communication Architecture," Journal of High Speed Networks, vol. 3:1 (1994), pp. 1-28.
Finn, Gregory G. and Mockapetris, Paul, "Netstation Architecture Multi-Gigabit Workstation Network Fabric," Proceedings of InterOp '94, Las Vegas, Nevada, May 1994, 9pp.
Wray, Stuart, et al.; Proceedings of the International Conference on Multimedia Computing and Systems, p. 265-273, Boston, 1994, May 1994.
"MPI: A Message-Passing Interface Standard," various forum members, Message-Passing Interface Forum, University of Tennessee, Knoxville, 1994, May 5, 1994 (corrected version), 239 pp.
Singh, Raj K., et al.; ACM Computer Communication Review, vol. 24, No. 3, p. 8-17, 1994, Jul. 1994.
Druschel, P., et al. "Experiences with a high-speed network adaptor: a software perspective," ACM Computer Communication Review, vol. 24, No. 4, 1994, Oct. 1994, pp. 2-13.
Floyd, Sally, ACM Computer Communication Review, vol. 24, No. 5, p. 8-23, 1994, Oct. 1994.
Edwards, A., et al.; ACM Computer Communication Review, vol. 24, No. 4, pp. 14-23, 1994, Oct. 1994.
Brakmo, L.S., et al., "TCP Vegas: new techniques for congestion detection and avoidance," ACM Computer Communication Review, vol. 24, No. 4, Oct. 1994, p. 24-35.
Romanow, A. and Floyd, S., ACM Computer Communication Review, vol. 24, No. 4, p. 79-88, 1994, Oct. 1994.
Black, R. J.; Leslie, I.; and McAuley, D., ACM Computer Communication Review, vol. 24, No. 4, p. 158-167, 1994, Oct. 1994.
Falsafi, Babak, et al.; Proceedings of the 1994 conference on Supercomputing, pp. 380-389, Washington D.C., Nov. 14, 1994.
Lin, Mengjou, et al., "Performance of High-Speed Network I/O Subsystems: Case Study of a Fibre Channel Network," Proc.1994 Conf. on Supercomputing, Washington D.C., Nov. 14, 1994, pp. 174-183.
Boden, Nanette J., et al.; Draft of paper published in IEEE Micro, vol. 15, No. 1, pp. 29-36, 1995, Nov. 16, 1994.
Sterling, Thomas, et al.; Proceedings of the 24th International Conference on Parallel Processing, pp. 11-14, Aug. 1995.
Kleinpaste, K.; Steenkiste, P.; and Zill, B., ACM Computer Communication Review, vol. 25, No. 4, p. 87-98, 1995, Oct. 1995.
Partridge, C.; Hughes, J.; and Stone, J., ACM Computer Communication Review, vol. 25, No. 4, p. 68-76, 1995, Oct. 1995.
Edwards, A. and Muir, S., "Experiences implementing a high performance TCP in user-space," ACM Computer Communication Review, vol. 25, No. 4, 1995, Oct. 1995, pp. 196-205.
Mogul, J. C., "The case for persistent-connection HTTP," ACM Computer Communication Review, vol. 25, No. 4, 1995, Oct. 1995, pp. 299-313.
Von Eicken, Thorsten, et al.; ACM Operating Systems Review, vol. 29, Issue 5, p. 109-126, 1995, Dec. 1995.
Tennenhouse, D. L. and Wetherall, D. J., ACM Computer Communication Review, vol. 26, No. 2, pp. 15-20, 1996, Apr. 1996.
Barham, Paul Ronald, "Devices in a Multi-Service Operating System," Ph.D. thesis, University of Cambridge, 1996, Jul. 1996, 142pp.
Chang, Chi-Chao, et al., "Low-Latency Communication on the IBM RISC System/6000 SP," Proc. 1996 ACM/IEEE conference on Supercomputing, Pittsburgh, Nov. 17, 1996, 17pp.
Touch, Joe, et al.; "Atomic-2" slides, Gigabit Networking Workshop '97 Meeting, Kobe, Japan, Apr. 1997, 10pp.
Touch, Joe, et al.; "Host-based Routing Using Peer DMA," Gigabit Networking Workshop '97 Meeting, Kobe, Japan, Apr. 1997, 2pp.
Angin, O., et al.; ACM Computer Communication Review, vol. 27, No. 3, pp. 100-117, 1997, Jul. 1997.
Thacker, Charles P. and Stewart, Lawrence C., ACM Operating Systems Review, vol. 21, Issue 4, p. 164-172, 1987, Oct. 1997.
Anderson, Ed, et al.; Proceedings of the 1997 ACM/IEEE conference on Supercomputing, p. 1-17, San Jose, California, Nov. 16, 1997.

(56) References Cited

OTHER PUBLICATIONS

Wassermann, Harvey J., et al.; Proceedings of the 1997 ACM/IEEE conference on Supercomputing, p. 1-11, San Jose, California, Nov. 16, 1997.
Buonadonna, Philip, et al.; Proceedings of the 1998 ACM/IEEE conference on Supercomputing, p. 1-15, Orlando, Florida, Nov. 7, 1998.
Husbands, Parry and Hoe, James C., Proceedings of the 1998 ACM/IEEE conference on Supercomputing, p. 1-15, Orlando, Florida, Nov. 7, 1998.
Warren, Michael S., et al., "Avalon: An Alpha/Linux Cluster Achieves 10 Gflops for $150k," Proc. 1998 ACM/IEEE conference on Supercomputing, Orlando, Florida, Nov. 7, 1998, 10pp.
Salmon, John, et al., "Scaling of Beowulf-class Distributed Systems," Proc. 1998 ACM/IEEE conference on Supercomputing, Orlando, Florida, Nov. 7, 1998, 18pp.
Chiou, Derek; Ang, Boon S., et al., "StarT-Voyager: A Flexible Platform for Exploring Scalable SMP Issues," Proc. 1998 ACM/IEEE conference on Supercomputing, Orlando, Florida, Nov. 7, 1998, 20pp.
Pope, S. L., et al., "Enhancing Distributed Systems with Low-Latency Networking," Parallel and Distributed Computing and Networks, Brisbane, Australia, 1998, Dec. 1998, 10pp.
De Vivo, M., et al.; ACM Computer Communication Review, vol. 29, No. 1, pp. 81-85, 1999, Jan. 1999.
Allman, M., "TCP Byte Counting Refinements," ACM Computer Communication Review, vol. 29, No. 3, 1999, Jul. 1999, pp. 14-22.
Muir, Steve and Smith, Jonathan, "Piglet: A Low-Intrusion Vertical Operating System," Technical Report MS-CIS-00-04, University of Pennsylvania, 2000, Jan. 2000, 15pp.
Crowley, Patrick, et al.; Proceedings of the 14th international conference on Supercomputing, pp. 54-65, Santa Fe, New Mexico, May 8, 2000.
Stone, Jonathan and Partridge, Craig, ACM Computer Communication Review, vol. 30, No. 4, pp. 309-319, 2000, Oct. 2000.
Feng, W. and Tinnakornsrisuphap, P., "The Failure of TCP in High-Performance Computational Grids," Proc. 2000 ACM/IEEE conference on Supercomputing, Dallas, Texas, Nov. 4, 2000, 11p.
Hsieh, Jenwei, et al., "Architectural and Performance Evaluation of GigaNet and Myrinet Interconnects on Clusters of Small-Scale SMP Servers," Proc. 2000 ACM/IEEE conference on Supercomputing, Dallas, Texas, Nov. 4, 2000, 9pp.
Pratt, Ian and Fraser, Keir, Proceedings of IEEE Infocom 2001, pp. 67-76, Apr. 22, 2001.
EP 16155319.3—Extended European Search Report dated Jul. 11, 2016, 9 pages.
Damianakis et al., "Reducing Waiting Costs in User-Level Communication", IPPS '97 Proceedings of the 11th International Symposium on Parallel Processing, pp. 381-387.
Dean, "Using Continuations to Build a User-Level Threads Library", MACH (1993), 18 pages.
Karlin, et al. "Empirical studies of competitve spinning for a shared-memory multiprocessor." ACM SIGOPS Operating Systems Review. vol. 25. No. 5. ACM, 1991, pp. 41-55.
U.S Appl. No. 13/158,176—Office Action dated Mar. 19, 2013, 60 pages.
U.S. Appl. No. 13/158,176—Response to Office Action dated Mar. 19, 2013, filed Aug. 5, 2013, 15 pages.
U.S. Appl. No. 13/158,176—Final Office Action dated Oct. 10, 2013, 26 pages.
U.S. Appl. No. 13/158,176—Response to Final Office Action dated Jun. 24, 2015, filed Apr. 10, 2014, 15 pages.
U.S. Appl. No. 13/158,176—Response to Office Action dated Jun. 30, 2014, filed Sep. 30, 2014, 15 pages.
U.S. Appl. No. 13/158,176—Response to Final Office Action dated Nov. 10, 2014, filed Apr. 24, 2015 pages.
U.S. Appl. No. 13/158,176—Advisory Action dated May 1, 2015, 3 pages.
U.S. Appl. No. 13/158,176—Response to Advisory Action dated May 1, 2015, filed May 11, 2015, 15 pages.
U.S. Appl. No. 13/158,176—Response to Office Action dated Jun. 24, 2015, filed Jan. 26, 1016, 11 pages.

\* cited by examiner
† cited by third party

EPOLL OPTIMISATIONS

PRIORITY CLAIM

This application is a divisional of the U.S. application Ser. No. 13/158,176, "Epoll Optimisations", filed on Jun. 10, 2011, which claims benefit to U.S. Provisional Application 61/470,396, "Epoll Optimisations,", filed on Mar. 31, 2011, both of which are hereby incorporated by reference for all purposes.

BACKGROUND OF THE INVENTION

This invention relates to methods for managing I/O event notifications in a data processing system and to methods for minimising the latency and jitter associated with the management of I/O event notifications.

Typically, input and output (I/O) operations in an operating system will be handled using file descriptors, which are abstract indicators that can provide a reference to the files, sockets, FIFOs, block or character devices, or other I/O resources maintained by the operating system. Processes running on the operating system use the file descriptors in calls to the operating system in order to reference the files, sockets etc. of the system, with the operating system maintaining a kernel-resident data structure containing the correspondence between each file descriptor and resource (file, socket etc.) of the system. This allows, for example, an application to read from a particular file by means of a read( ) system call to the operating system that includes the file descriptor associated with that file. The operating system looks up the file corresponding to the provided file descriptor and, if the necessary permissions are satisfied, performs the requested read operation on behalf of the application.

An operating system generally provides several mechanisms for managing the file descriptors that are used for I/O. For example, in Linux, the select, poll and epoll mechanisms are provided as part of the system call API, each of which allows a process to monitor sets of file descriptors for an event such as a file descriptor becoming ready to perform I/O, or data being updated at the memory location identified by the file descriptor. The sets of file descriptors that an application wishes to monitor are typically held in objects that can be managed through the mechanisms provided by the operating system, with each object holding a set of file descriptors relating to the application. For example, in Linux an application can establish an epoll instance for handling a set of file descriptors that the application wishes to monitor, the epoll instance being managed by means of epoll_create( ), epoll_ctl( ) and epoll_wait( ) system calls provided by the epoll mechanism.

Each of the mechanisms will typically have different performance characteristics. For example, the epoll_wait( ) system call is more efficient than the equivalent select( ) and poll( ) calls when the set of file descriptors is large. However, the epoll mechanism is relatively inefficient when the set of monitored file descriptors and I/O events changes because this additionally requires calls to epoll_ctl( ). Since the calls to a kernel mechanism such as epoll are system calls, they require a context switch from the application making the call into the kernel and are therefore relatively expensive in terms of processing overhead. Each context switch consumes processing resources and can introduce unwanted latency into the system. Epoll is typically used as follows:

```
/* Create an epoll set. */
epoll_set = epoll_create(...);
/* Add file descriptor(s) to the set. */
epoll_ctl(epoll_set, EPOLL_CTL_ADD, fd, event);
/* Wait for file descriptors in set to become ready. */
n_events = epoll_wait(epoll_set, events, maxevents, timeout);
/* Use the file descriptors that are ready. */
for( i = 0; i < n; ++i )...
```

In contrast, with the select or poll mechanisms, the set of file descriptors to monitor is supplied in a single select( ) or poll( ) call that also waits for the file descriptors to become ready. For example, the above epoll use can be achieved as follows with poll:

```
/* Add file descriptor(s) to a set. */
pfds[n_fds].fd = fd;
pfds[n_fds].events = POLLIN;
++n_fds;
/* Wait for file descriptors in set to become ready. */
n_events = poll(pfds, n_fds, timeout);
/* Use the file descriptors that are ready. */
for( i = 0; i < n; ++i )...
```

Thus, the poll and select mechanisms tend to be more efficient when the set of file descriptors to be monitored changes frequently over time, and the epoll mechanism tends to be more efficient when the set of file descriptors is relatively large and remains relatively static.

Another problem with conventional I/O event notification mechanisms is that they can introduce significant latency and jitter into the processing performed by the threads of an application due to the blocking of I/O event notification threads that are waiting for events at the descriptors monitored by the application. This is of particular concern in data processing systems that have user-level network stacks operating over high bandwidth network interface devices. In order to provide a low latency, high speed data path between a user-level stack and its network interface device, it is generally important to minimise the latency and jitter experienced by the stack due to kernel processes.

There is therefore a need for an I/O event notification mechanism that can be efficiently used with large sets of file descriptors when the set of file descriptors changes frequently. There is also a need for improved mechanisms for invoking system calls so as to minimise the latency and jitter associated with the management of I/O event notifications.

SUMMARY OF THE INVENTION

According to a first aspect of the present invention there is provided a method for managing I/O event notifications in a data processing system, the data processing system comprising a plurality of applications and an operating system having a kernel and an I/O event notification mechanism operable to maintain a plurality of I/O event notification objects each handling a set of file descriptors associated with one or more I/O resources, the method comprising: for each of a plurality of application-level configuration calls: intercepting at a user-level interface a configuration call from an application to the I/O event notification mechanism for configuring an I/O event notification object; and storing a set of parameters of the configuration call at a data structure, each set of parameters representing an operation on the set of file descriptors handled by the I/O event notification object; and subsequently, on a predetermined criterion being met: the user-level interface causing the plurality of configuration calls to be effected by means of a first system call to the kernel.

Preferably the method further comprises, subsequent to each intercepting step, returning processing to the application that made the respective configuration call. Preferably the intercepting and storing steps are performed without invoking any system calls.

Suitably the I/O event notification mechanism is configured such that each file descriptor of an I/O event notification object is individually configurable by means of a configuration call from the application to the I/O event notification mechanism.

Preferably the step of causing the plurality of configuration calls to be effected comprises: the user-level interface making the first system call to the kernel so as to pass the data structure to a kernel library; and the kernel library invoking a configuration routine of the I/O event notification mechanism for each set of parameters stored in the data structure so as to configure the I/O event notification object in accordance with the configuration calls. The data structure could be passed to the kernel library by one of: passing a reference to the data structure, passing a copy of at least part of the data structure, and passing a representation of the data structure into the kernel context. Suitably the I/O event notification mechanism is epoll and the configuration routine is epoll_ctl( ).

Each operation on the set of file descriptors held by the I/O event notification object could be an operation to add a file descriptor to the set, modify an event type to be monitored by the I/O event notification object in respect of a file descriptor of the set, or delete a file descriptor from the set of file descriptors.

Preferably the method further comprises, prior to the invoking step: combining into a single operation those operations represented by the sets of parameters stored at the data structure that are associated with the same file descriptor of the I/O event notification object; and replacing the operations represented by those sets of parameters with the single operation in the invoking step. The single operation could be do nothing if the operations represented by the sets of parameters stored at the data structure cancel each other out. Preferably the combining step is performed by the user-level interface or the kernel library.

Preferably the method further comprises intercepting at the user-level interface a wait call from the application to the I/O event notification mechanism for causing the I/O event notification object to wait for an event associated with one or more of its file descriptors, and the predetermined criterion being the reception of a wait call from the application at the user-level interface. Preferably the predetermined criterion is additionally met if no wait call is received at the user-level interface but one of the following occurs: a predetermined time period expires; or the storage space required at the data structure for storing the sets of parameters representing operations to be performed on the set of file descriptors handled by the I/O event notification object exceeds a predetermined size.

Preferably the method further comprises, subsequent to the step of causing the plurality of configuration calls to be effected, the user-level interface causing the I/O event notification object to wait for an event associated with one or more of the file descriptors of the I/O event notification object by means of a second system call to the kernel. Preferably the second system call is to the kernel library and the step of causing the I/O event notification object to wait for an event comprises invoking a wait routine of the I/O event notification mechanism. Suitably the I/O event notification mechanism is epoll and the wait routine is epoll_wait( ) or epoll_pwait( ). Preferably the first and second system calls are made by means of a single unified system call from the user-level interface to the kernel library.

Suitably the operating system comprises a plurality of I/O event notification objects and the user-level interface relates to a single I/O event notification object. Suitably the I/O event notification object handles a set of file descriptors corresponding to a network interface device. The file descriptors could correspond to receive or transmit buffers. The user-level interface could be provided at a user-level network stack.

Preferably the method further comprises the step of not enabling interrupts at the operating system in respect of file descriptors on which the operations represented by the sets of parameters stored at the data structure are operations to add or modify a file descriptor managed by the user-level network stack.

According to a third aspect of the present invention there is provided a data processing system comprising: a plurality of applications; an operating system having a kernel and an I/O event notification mechanism operable to maintain a plurality of I/O event notification objects each handling a set of file descriptors associated with one or more I/O resources; a data structure operable to store parameters of application-level configuration calls, each set of parameters representing an operation on the set of file descriptors handled by the I/O event notification object to which the respective configuration call is directed; and a user-level interface configured to intercept a plurality of configuration calls from an application to the I/O event notification mechanism for configuring an I/O event notification object and store parameters of the configuration calls at the data structure; wherein the user-level interface is configured to, on a predetermined criterion being met, cause the plurality of configuration calls to be effected by passing at least part of the data structure into the kernel context and invoking a system call to the kernel.

According to a second aspect of the present invention there is provided a method for processing a blocking system call at a data processing system comprising an operating system that supports kernel and user-level contexts, the method comprising: intercepting a blocking system call from an entity running a kernel or user-level context; and repeatedly invoking the system call in non-blocking mode until one of the following conditions is satisfied: a non-blocking system call returns a value; or a first predetermined time period expires; and on one of the conditions being satisfied, returning to the entity a response to its blocking system call comprising a value returned by a non-blocking system call or a notification that the first predetermined time period expired.

Preferably the method further comprises, on one of the conditions being satisfied, enabling interrupts for the entity on the entity next becoming blocked.

Preferably the first predetermined time period is a timeout of the entity indicating the maximum length of time before the blocking call is to return.

Preferably the step of repeatedly invoking the system call in non-blocking mode comprises: repeatedly invoking the system call in non-blocking mode for no longer than a maximum length of time expressed by a second predetermined time period; and if the second predetermined time period expires: invoking the system call in blocking mode; and enabling interrupts for the entity.

Preferably each non-blocking system call is invoked with a timeout parameter of zero.

Suitably the intercepting step is performed in the kernel context. Alternatively, the intercepting step is performed at a user-level interface, the user-level interface: replacing the blocking system call with a new system call; and causing, by means of the new system call, the step of repeatedly invoking the system call to be performed in the kernel context.

Preferably the data processing system comprises a plurality of CPU cores.

Preferably the step of repeatedly invoking the system call in non-blocking mode further comprises not enabling interrupts for the entity whilst the system call is being repeatedly invoked in non-blocking mode. Preferably the step of repeatedly invoking the system call in non-blocking mode further comprises not enabling interrupts for the entity in respect of the non-blocking system calls.

Suitably the operating system is Linux and the blocking system call is one of epoll( ), select( ), poll( ), read( ), write( ), send( ), recv( ), accept( ) and futex( ).

DESCRIPTION OF THE DRAWINGS

The present invention will now be described by way of example with reference to the accompanying drawings, in which.

DETAILED DESCRIPTION OF THE DRAWINGS

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The present invention is for use at a data processing system having an operating system that provides an I/O event notification mechanism at its kernel and that is operable to support a plurality of user-level applications. A data processing system could be a server, personal computer, network switch, or any other kind of computing device having a baseboard, one or more CPU cores, a memory and a set of I/O resources. The operating system could be any operating system that provides an I/O event notification mechanism configurable by user-level applications by means of a system call. For example, the operating system could be Linux, FreeBSD, Solaris, or Windows.

According to a first aspect of the present invention there is provided a method for improving the effective performance of an I/O event notification mechanism operable to manage I/O event notification objects handling a plurality of file descriptors. In particular, the first aspect of the present invention is advantageous if each file descriptor entry of an I/O event notification object must be individually configured by means of a system calls from the respective user-level application to the I/O event notification mechanism.

Figure 1:
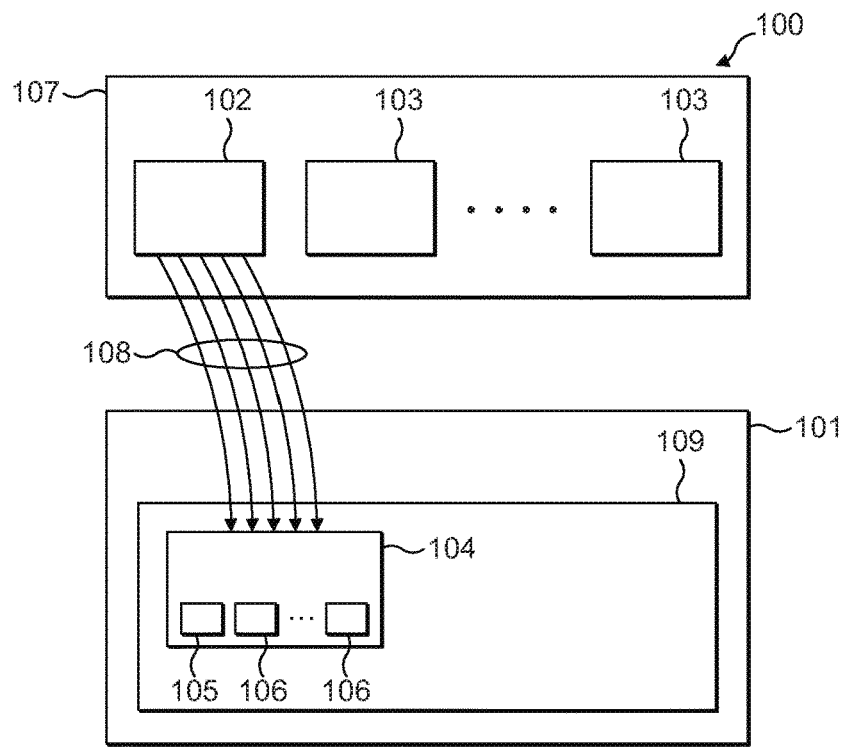
FIG. 1 is a schematic diagram of a data processing system of a conventional data processing system.

A schematic diagram of a conventional data processing system is shown in FIG. 1. Data processing system 100 comprises an operating system 101 that provides an I/O event notification mechanism 104 in the kernel context through which I/O event notification objects 105 and 106 may be managed. The operating system supports applications 102 and 103 at user-level 107. In this example, the operating system is Linux, the I/O event notification mechanism is epoll, and the I/O event notification objects are epoll instances.

In the conventional data processing system of FIG. 1, the file descriptors of an epoll instance 105 are configured as follows. Application 102 makes a set of epoll_ctl( ) system calls 108, each epoll_ctl( ) call being a request to add a descriptor to the set of descriptors handled by its epoll instance 105, to modify the event type monitored in respect of a descriptor of the set, or to delete a descriptor of the set. Each epoll_ctl( ) call specifies the file descriptor to which it corresponds and identifies the event type that the epoll instance is to monitor for that file descriptor.

Each system call causes a context switch from the user-level context 107 into the kernel context 109 so as to pass the parameters of the call from the application to epoll. The five epoll_ctl( ) calls shown in FIG. 1 therefore involve five context switches to and from the user-level context and the kernel context. Once the application has configured the set of descriptors of the epoll instance 105, the application makes an epoll_wait( ) system call so as to cause epoll to start waiting for the identified event types of each of the set of descriptors. To configure and start an epoll instance therefore requires six context switches in total to and from user-level into the kernel.

Figure 2:
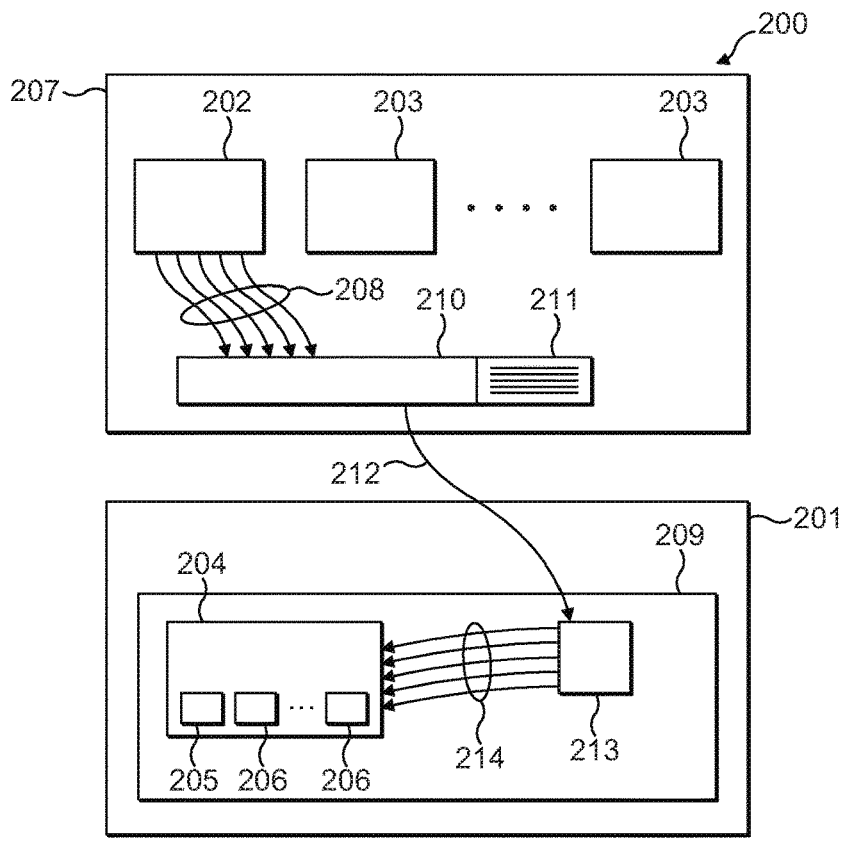
FIG. 2 is a schematic diagram of a data processing system configured in accordance with the present invention.

FIG. 2 shows a data processing system configured in accordance with the present invention. Data processing system 200 comprises an operating system 201, that provides an I/O event notification mechanism 204 in the kernel context through which I/O event notification objects 205 and 206 may be managed. The operating system supports applications 202 and 203 at user-level 207. The data processing system further comprises a user-level interface 210 for intercepting system calls from the applications to the I/O event notification mechanism, and a kernel library 213 for directly calling routines of the I/O event notification mechanism. Kernel library 213 operates in the context of the kernel 209.

The operation of the present invention will now be described by example. In this example the operating system is Linux, the I/O event notification mechanism is epoll, and the I/O event notification objects are epoll instances. In order to configure the descriptors handled by its epoll instance 205, an application 202 makes the same set of epoll_ctl( ) system calls 208 as in FIG. 1. The present invention does not therefore require any modification to applications which can continue to make the same calls to epoll in the same way. However, in FIG. 2, each epoll_ctl( ) call is intercepted by the user-level interface 210 so that the calls do not cause a switch into the kernel context. For example, in Linux, the user-level interface could be configured to intercept calls using the LD_PRELOAD mechanism.

On intercepting each epoll_ctl( ) call, the user-level interface stores the parameters of the call at a data structure 211 that may or may not be provided at user-level interface 210 but which can be written to in the user-level context without the need for a context switch into the kernel. Processing returns to the application 202 after each call is intercepted without any system calls being invoked. In this manner, a set of parameters for each epoll_ctl( ) call made by the application is stored at the data structure. There is no limitation as to how the parameters can be stored at the data structure provided that sufficient information is retained to allow the epoll_ctl( ) calls to be recreated: copies of the epoll_ctl( ) calls themselves could be stored, copies of the significant parameters of the epoll_ctl( ) calls could be stored, or the data structure could hold a representation of the epoll_ctl( ) calls or their significant parameters.

At a later time, when several epoll_ctl( ) calls directed to epoll instance 205 may have been intercepted and their parameters stored at the data structure, the user-level interface makes a single system call 212 so as to pass the aggregated parameters of the stored epoll_ctl( ) calls to the kernel library 213. This system call 212 will be termed epoll_ctl_many( ). The system call may pass the parameters to the kernel library by passing a reference (such as a file descriptor) to the data structure or its relevant parts, passing a copy of at least part of the data structure, or passing some other representation of the information content of the data structure.

Once processing has passed to the kernel library, the kernel library calls epoll_ctl( ) 214 for each set of parameters stored in the data structure so as to effect the epoll configuration operations represented by the sets of parameters. Since the kernel library operates within the kernel context these calls do not involve a context switch from user-level into the kernel. Thus, the present invention replaces multiple system calls from the application with a single system call from the user-level interface, reducing the number of context switches between the kernel and user-level, and hence reducing CPU overhead and improving system performance.

Each application may have multiple epoll instances and there may be multiple applications; an operating system might therefore maintain many epoll instances. Preferably the data structure can store the parameters of epoll_ctl( ) calls that relate to different epoll instances. However, the user-level interface is preferably configured to aggregate only those configuration calls that relate to a particular epoll instance. This is readily achieved by grouping parameters in the data structure according to the epoll instance to which they relate.

The user-level interface is preferably configured to defer making the system call epoll_ctl_many( ) until the application calls epoll_wait( ). This can be achieved by arranging that the user-level interface additionally intercepts epoll_wait( ) calls from the application to epoll. Once an epoll_wait( ) call has been intercepted, the user-interface can be configured to handle the call in one of two ways.

Firstly, the user-level interface can be configured to make the epoll_ctl_many( ) system call so as to cause the kernel library to configure epoll instance 205 in accordance with the epoll_ctl( ) calls that originated from the application, and then to make either an epoll_wait( ) system call directly to epoll, or a second system call to the kernel library so as to cause the kernel library to call epoll_wait( ).

Secondly and preferably, the user-level interface is configured to make a single epoll_ctl_and_wait( ) call to the kernel library so as to cause the kernel library to configure epoll instance 205 in accordance with the epoll_ctl( ) calls that originated from the application and then call epoll_wait( ). This is preferable because it allows an epoll instance to be configured and started with one fewer context switch, further reducing the CPU overhead associated with managing I/O event notification objects.

It can be useful to arrange that in the absence of an epoll_wait( ) call from the application, the user-interface makes the epoll_ctl_many( ) call when a timer reaches a predetermined value or when the storage space required at the data structure for storing the sets of parameters exceeds a predetermined size. This can avoid having a significant number of epoll configuration operations represented by the sets of parameters becoming backed-up at the data structure.

Often, a configuration call to epoll from an application will override or cancel the effect of an earlier call associated with the same file descriptor. Further efficiency gains can be made by combining those epoll configuration operations represented by the sets of parameters at the data structure that are associated with the same file descriptor. The kernel library is configured to call epoll_ctl( ) using the parameters of the combined operation for any descriptors in respect of which there are multiple operations represented in the data structure. This is preferably performed at the user-level interface but could alternatively be performed at the kernel library prior to the kernel library calling epoll_ctl( ) for each set of parameters stored at the data structure for epoll instance 205. The following table shows how epoll configuration operations can be combined:

| 1st operation | 2nd operation | Combined operation |
| --- | --- | --- |
| EPOLL_CTL_ADD | EPOLL_CTL_MOD | EPOLL_CTL_ADD |
| EPOLL_CTL_ADD | EPOLL_CTL_DEL | cancel |
| EPOLL_CTL_MOD | EPOLL_CTL_MOD | EPOLL_CTL_MOD |
| EPOLL_CTL_MOD | EPOLL_CTL_DEL | EPOLL_CTL_DEL |
| EPOLL_CTL_DEL | EPOLL_CTL_ADD | EPOLL_CTL_MOD or cancel |

Thus, an operation to add a new file descriptor to an epoll instance followed by an operation to modify the event to which that descriptor relates can be expressed as a single operation to add a new file descriptor having the modified event. Successive operations to add and then delete the same descriptor cancel one another out, although successive operations to delete and then add the same descriptor may not cancel one another out because the operation to add a descriptor may be associated with a different event type to the operation to delete that descriptor. Successive operations to modify the event to which a descriptor relates can generally be expressed by the last modify operation.

The present application finds particular application in data processing systems that include a user-level network stack configured to perform protocol processing of data received over or to be transmitted over a network interface device. Such user-level stacks typically handle large numbers of file descriptors that relate to receive and transmit queues of the data processing system. Furthermore, since receive and transmit queues can be rapidly re-configured as connections are established and taken down, it is advantageous for the PO event notification mechanisms to be as efficient as possible. This is of particular concern in data servers that might make thousands of new connections a second.

In data processing systems having a user-level network stack, the user-level interface 210 is preferably provided at the user-level network stack. There can be multiple user-level interfaces per data processing system, each being part of a different user-level network stack.

According to a second aspect of the present invention there is provided a method for reducing the latency and jitter of an I/O event notification mechanism operable to manage I/O event notification objects handling a plurality of file descriptors. In particular, the second aspect of the present invention is advantageous in data processing systems having multiple CPU cores.

Conventionally, when an I/O event notification object is invoked by a system call, the object blocks until new I/O events are available for one of the descriptors handled by the I/O event notification object. For example, epoll_wait( ) is generally invoked by an application for an epoll instance such that the routine blocks until I/O events are available for one of the descriptors handled by that instance.

The second aspect of the present invention provides a way in which such blocking calls to an I/O event notification object are replaced by a busy-wait loop that repeatedly makes non-blocking calls to an I/O event notification object with a timeout of zero such that the object returns immediately after it is invoked. This will be described with reference to FIG. 2 by way of an example in which the operating system is Linux, the I/O event notification mechanism is epoll, and the I/O event notification objects are epoll instances.

Consider the preferred embodiment described above in relation to FIG. 2 and the first aspect of the present invention in which kernel library 213 calls epoll_wait( ) on behalf of application 202. Instead of invoking epoll_wait( ) by means of a conventional blocking call, the kernel library performs a busy-wait loop that repeatedly invokes epoll_wait( ) in non-blocking mode with a timeout of zero. The loop is performed until I/O events become available for one of the descriptors handled by the respective epoll instance 205, or a timeout specified in the busy-wait loop expires. If a non-blocking call returns an I/O event, the busy-wait loop exits and an indication of the I/O event is returned to the application. The timeout specified in the busy-wait loop expresses the maximum time that the busy-wait loop should spin for and is preferably user-configurable. If the busy-wait loop timeout expires then preferably a blocking system call is invoked and interrupts are enabled for the application.

Figure 3:
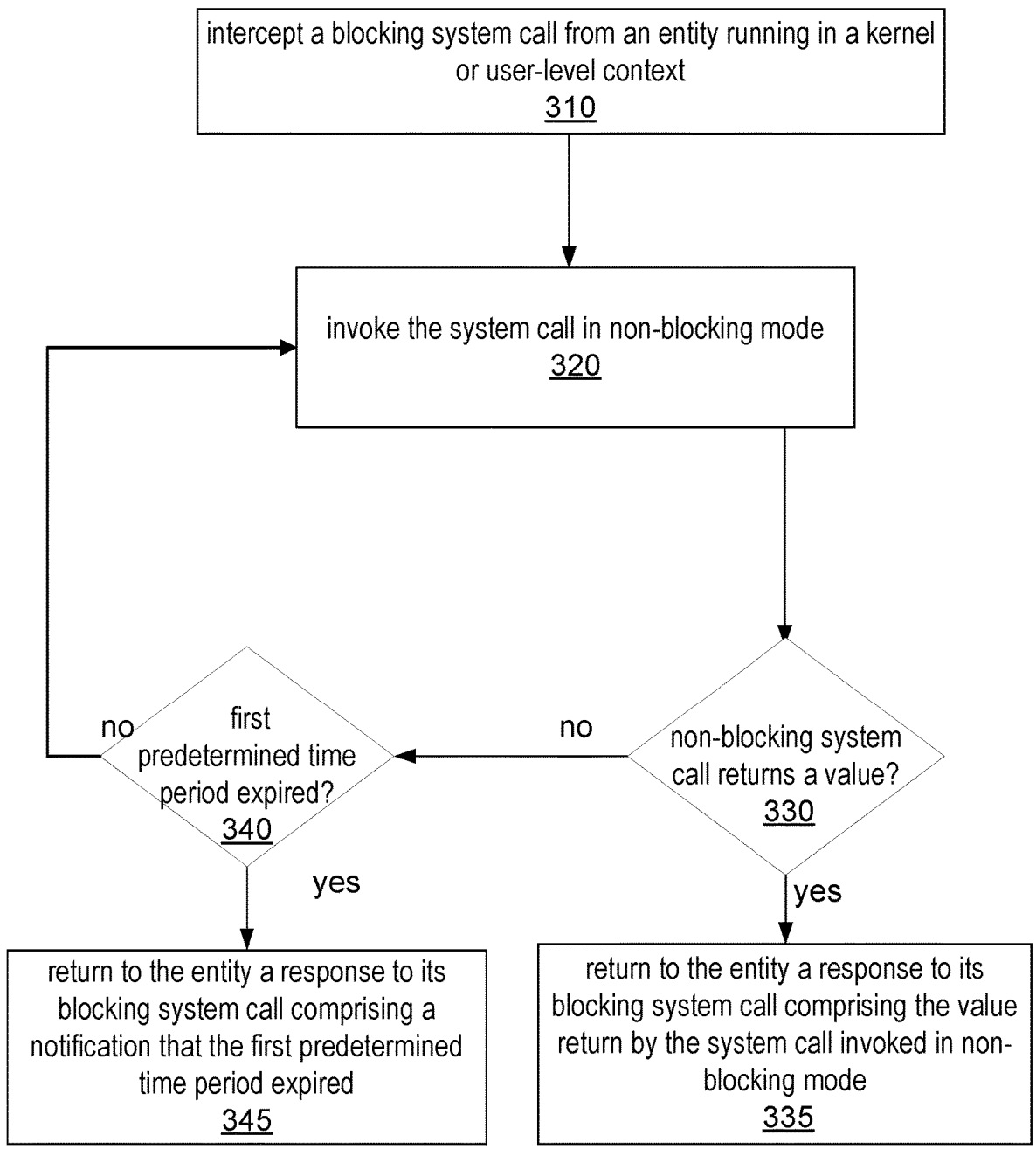
FIG. 3 is a flow diagram illustrating processing a blocking system call at a data processing system, according to an embodiment of the invention.

FIG. 3 is a flow diagram illustrating processing a blocking system call at a data processing system, according to an embodiment of the invention. In Step 310, a blocking system call from an entity running in a kernel context or user-level context is intercepted. In Step 320, the system call is invoked in non-blocking mode. In Step 330, if the non-blocking system call returns a value, then in Step 335 a response to its blocking system call is returned to the entity, the response comprising the value returned by the system call invoked in non-blocking mode. If the non-blocking system call does not return a value, then in Step 340, determine whether a first predetermined time period has expired. If the first time period has expired, then in Step 345, return to the entity a response indicating that the first predetermined time period expired. If the first time period has not expired, then repeat the loop starting in Step 320 to invoke the system call in non-blocking mode.

There may additionally be a timeout specified by application 202 which specifies the maximum time before the blocking system call it attempts to invoke should return. The application timeout is specified by the application and typically forms a standard part of the system call API. The busy-wait loop is configured to exit on this timeout being reached and an indication is returned to the application that its timeout expired.

The busy-wait loop could be configured as follows:

```
int epoll_busy_wait(epoll_set, events, max_events, timeout)
{
    do {
        rc = epoll_wait(epoll_set, events, max_events, 0 /*
          nonblocking */);
        if( rc != 0 )
            return rc;
        if( timeout_exceeded(timeout) )
            return 0;
    } while( ! timeout_exceeded(busy_wait_timeout) );
    /* Subtract time spent busy-waiting from timeout. */
    timeout = timeout - busy_wait_timeout;
    return epoll_wait(epoll_set, events, max_events, timeout);
}
```

By repeatedly invoking epoll_wait( ) in a non-blocking mode, the latency experienced by the entity making the system call (in this case the kernel library, but more generally an application) is reduced because the thread that invoked epoll_wait( ) does not need to be woken when an I/O event becomes available—the thread is active since it invoked epoll_wait( ) with a zero timeout and is waiting for an immediate response. Furthermore, the inventors have recognised that in multi-core data processing systems, because the CPU core on which epoll_wait( ) is running is kept busy by the looping code, jitter in the system is also reduced. This is because the task scheduler of the operating system is likely to schedule threads to other less busy cores in preference to the CPU core consumed by the code loop. It is of particular importance to minimise jitter in data processing systems having user-level network stacks operating over high bandwidth network interface devices, such as 10 GigE and 40 GigE devices.

The busy-wait loop can be embodied in a routine provided by the kernel library and invoked by a system call from the user-level interface (e.g. epoll_ctl_many( ) or epoll_ctl_and_wait( )). Thus, in preference to invoking epoll_wait( ) in the conventional manner, the kernel library is configured to instead repeatedly invoke epoll_wait( ) in a non-blocking mode in accordance with the second aspect of the present invention. Alternatively, the busy-wait loop can replace the standard kernel implementation of epoll_wait( ) such that the busy-wait loop is performed when epoll_wait( ) is called. Least preferably, the busy-wait loop can be implemented at user-level (for example, at the user-level interface 210). However, this causes a single blocking system call to epoll_wait( ) to be converted into multiple non-blocking system calls to epoll_wait( ) and significantly increases latency.

The second aspect of the present invention is not limited to use with I/O event notification mechanisms and is equally applicable to all system calls in an operating system that block. For example, on Linux other system calls that can be invoked according to the second aspect of the present invention include select( ), poll( ), read( ), write( ), send( ), recv( ), accept( ) and futex( ).

In a most preferred embodiment of the present invention, the first and second aspects of the invention are implemented (advantageously in their preferred forms) at a user-level network stack, such as the OpenOnload stack. Thus, user-level interface 210 is provided at the user-level network stack. The kernel library 213 may be installed into the operating system on installing the user-level stack. For example, the user-level stack may form part of a software package for use with a network interface device coupled to the data processing system, and the kernel library could form part of that software package. The kernel library could be provided at a driver for such a network interface device.

Preferably a user-level interface at a user-level network stack is configured to intercept only those I/O event notification configuration calls that relate to descriptors handled by the user-level network stack.

It is generally desirable to avoid interrupting an application whilst it is running so as to avoid unwanted CPU load and jitter. This is particularly true when an application is transmitting and/or receiving data over a network interface device (typically provided as a peripheral card in a data processing system, e.g. a PCIe NIC). It is therefore desirable that user-level network stacks are configured so as to avoid interrupting an application communicating by means of the stack whilst that application is running, but to enable interrupts when the application blocks whilst waiting for network I/O. Interrupts are required when an application is blocked in order to wake the application in a timely manner and handle network events.

With respect to the present invention, interrupts are therefore preferably handled in the following ways. When the user-level interface intercepts an epoll_ctl( ) call, the user-level interface does not cause interrupts to be enabled for the application in respect of the epoll instance. If necessary, the user-level interface is configured to prevent interrupts being enabled for the application in respect of the epoll instance. In the case in which the user-level interface is at a user-level network stack, the application does not cause or prevents interrupts being enabled for the application in respect of the epoll instance for file descriptors handled by the user-level network stack.

Preferably, interrupts are not enabled for an application in respect of the epoll instance while a busy-wait loop is running. For example, in the preferred embodiments, when a system call is invoked to cause the kernel library to start an epoll instance, the kernel library does not enable (or prevents from being enabled) interrupts for the respective application whilst the busy-wait loop with which the I/O events are monitored is running. More generally, it is preferable that a data processing system is configured to not enable (or prevent interrupts being enabled) for the respective application when epoll_wait( ) is invoked as a non-blocking call. This is most preferable in respect of epoll instances handling file descriptors managed by a user-level network stack. Interrupts are preferably then enabled when the busy-wait timeout is exceeded and the application goes on to block. Interrupts are preferably also enabled when the epoll instance receives an event and the application goes on to block.

An exemplary implementation of a unified system call provided by the kernel library for configuring and starting an epoll instance is set out in pseudo "C" code in Annex A. This call would be invoked by a user-level interface so as to configure an epoll instance in accordance with the deferred operations stored at the data structure, start the epoll instance using a busy-wait loop and supress interrupts in the manner described above.

The present invention has been described herein with reference to the epoll I/O event notification mechanism provided in the Linux operating system. However, the present invention is not limited to a particular operating system and equally finds application in other operating systems, such as FreeBSD (in which the epoll equivalent is kqueue) and Solaris (which provides an analogous event completion API). The present invention applies equally to both non-virtualised and virtualised instances of operating systems.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

Annex A

An exemplary implementation of a unified system call provided by the kernel library for configuring and starting an epoll instance.

```
int onload_epoll_wait(epoll_set, events, max_events, timeout,
                     busy_wait_timeout, deferred_epoll_ctl_ops)
{
    /* Prevent interrupts from being enabled when the real epoll_ctl( )
    and
    * epoll_wait( ) calls are invoked.
    */
    onload_suppress_interrupts( );
    /* Invoke any deferred epoll_ctl( ) operations with interrupts
    * suppressed.
    */
    for_each(deferred_epoll_ctl_ops)
        epoll_ctl(epoll_set, op, fd, event);
    /* Invoke real epoll_wait( ) with interrupts suppressed. Busy-wait if
    * configured to do so.
    */
    do {
        rc = epoll_wait(epoll_set, events, max_events, 0 /* nonblocking
        */);
        if( rc != 0 )
            return rc;
        if( timeout_exceeded(timeout) )
            return 0;
    } while( ! timeout_exceeded(busy_wait_timeout) );
    /* Subtract time spent busy-waiting from timeout. */
    timeout = timeout - busy_wait_timeout;
    /* Enable interrupts for each stack associated with the set of
    * file descriptors in the epoll set.
    */
    onload_enable_interrupts( );
    return epoll_wait(epoll_set, events, max_events, timeout);
}
```

We claim:

1. A method for processing a blocking system call at a data processing system comprising an operating system that supports kernel and user-level contexts, the method comprising:
   intercepting a blocking system call from an entity running in a kernel context or user-level context, wherein when executed the blocking system call invokes an operation and blocks until the operation occurs;
   in response to intercepting the blocking system call, instead of executing the blocking system call, repeatedly executing the system call in non-blocking mode for a first timeout period; and
   in response to determining that the system call in non-blocking mode has not returned a value within the first timeout period, subtracting the first timeout period from a second timeout period and executing the blocking system call for a remainder of the second timeout period after subtraction.

2. A method as claimed in claim 1, further comprising, in response to determining that the system call in non-blocking mode has not returned a value within the first timeout period, enabling interrupts for the entity.

3. A method as claimed in claim 1, wherein the system call is executed in non-blocking mode with a third timeout of zero.

4. A method as claimed in claim 1, wherein the intercepting step is performed in the kernel context.

5. A method as claimed in claim 1, wherein the intercepting step is performed at a user-level interface, the user-level interface:
   replacing the blocking system call with a new system call; and
   causing, by means of the new system call, the step of repeatedly executing the system call in non-blocking mode to be performed in the kernel context.

6. A method as claimed in claim 1, wherein the data processing system comprises a plurality of CPU cores.

7. A method as claimed in claim 1, wherein the step of repeatedly executing the system call in non-blocking mode further comprises not enabling interrupts for the entity whilst the system call is being repeatedly executed in non-blocking mode.

8. A method as claimed in claim 1, wherein the step of repeatedly executing the system call in non-blocking mode further comprises not enabling interrupts for the entity in respect of the system calls.

9. A method as claimed in claim 1, wherein the operating system is Linux and the blocking system call is one of epoll( ) select( ) poll( ) read( ) write( ), send( ) recv( ) accept( ) and futex( ).

10. A method as claimed in claim 1, wherein the first timeout period expresses a maximum number of times that the system call is to be executed in non-blocking mode.

11. A data processing system comprising a memory and one or more processors coupled to the memory, the one or more processors configured to execute an operating system that supports kernel and user-level contexts, the memory having stored therein a plurality of software code portions defining logic for:
   intercepting a blocking system call from an entity running in a kernel context or user-level context, wherein when executed the blocking system call invokes an operation and blocks until the operation occurs;
   in response to intercepting the blocking system call, instead of executing the blocking system call repeatedly executing the system call in non-blocking mode for a first timeout period; and
   in response to determining that the system call in non-blocking mode has not returned a value within the first timeout period, subtracting the first timeout period from a second timeout period and executing the blocking system call for a remainder of the second timeout period after subtraction.

* * * * *